(12) United States Patent
Luo et al.

(10) Patent No.: US 11,908,300 B1
(45) Date of Patent: *Feb. 20, 2024

(54) SENSOR PAD COVER

(71) Applicants: Wilson W Luo, Los Angeles, CA (US); Zhi Guang Hou, Chaoyang Liaoni (CN)

(72) Inventors: Wilson W Luo, Los Angeles, CA (US); Zhi Guang Hou, Chaoyang Liaoni (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/129,738

(22) Filed: Mar. 31, 2023

Related U.S. Application Data

(63) Continuation-in-part of application No. 18/121,443, filed on Mar. 14, 2023.

(51) Int. Cl.
| | | |
|---|---|---|
| *G08B 13/14* | (2006.01) |
| *G08B 21/04* | (2006.01) |
| *G01D 11/24* | (2006.01) |
| *G08B 21/22* | (2006.01) |

(52) U.S. Cl.
CPC ....... *G08B 21/0461* (2013.01); *G01D 11/245* (2013.01); *G08B 21/22* (2013.01)

(58) Field of Classification Search
CPC ... G08B 21/0461; G08B 21/22; G01D 11/245
USPC .................................................... 340/573.1
See application file for complete search history.

(56) References Cited

U.S. PATENT DOCUMENTS

| | | | | |
|---|---|---|---|---|
| 5,019,950 A | * | 5/1991 | Johnson | A47G 27/0243 362/802 |
| 5,848,830 A | * | 12/1998 | Castle | G09F 19/228 362/276 |
| 9,068,720 B2 | * | 6/2015 | Mangus | F21V 15/012 |
| 2010/0316528 A1 | * | 12/2010 | Jordan | A01N 25/34 424/411 |
| 2015/0203272 A1 | * | 7/2015 | Versteylen | B65D 81/268 428/408 |
| 2020/0281762 A1 | * | 9/2020 | Harvey | B32B 27/12 |
| 2022/0307164 A1 | * | 9/2022 | McCarthy | C02F 1/286 |
| 2023/0116591 A1 | * | 4/2023 | Rumold | A47G 27/0206 15/215 |

* cited by examiner

*Primary Examiner* — Tai T Nguyen
(74) *Attorney, Agent, or Firm* — Plager Schack LLP; Mark H. Player; Naomi Mann

(57) ABSTRACT

Disclosed is a sensor pad outer cover comprising a first surface layer and a second surface layer which together form an accommodating cavity configured to receive a sensor pad body of a medical sensor pad, the first surface layer further comprising a non-slip layer, wherein both the first and second surface layers are formed from at least one biodegradable material for reduced environmental pollution.

9 Claims, 3 Drawing Sheets

SENSOR PAD COVER

RELATED APPLICATION

This application is a continuation-in-part of application Ser. No. 18/121,443, filed Mar. 14, 2023, which claims benefit to Chinese Application No. 202222301148.1 filed on Aug. 31, 2022, which has been approved on Mar. 3, 2023 as Chinese Patent No. CN218552597U, all of which are all incorporated herein by reference in their entirety.

BACKGROUND

The present disclosure relates generally to medical nursing auxiliary equipment, and more specifically to medical sensor pads.

Sensor pads are a common health care product, which may be used for various applications including fall management. In some applications, a sensor pad may be placed on a bed, seat, wheelchair, or other location to detect whether a user has left the location, fallen, or may otherwise need help. Conventional sensor pad covers may be made of PVC material, which provides a relatively smooth surface. This may cause the sensor pad to be easily displaced and/or detached when the user moves. Additionally, the PVC material may be affected by temperature and humidity, whereby the pad may become increasingly slippery as humidity increases. As such, there is a need for an improved system that addresses at least the above-mentioned limitation of the prior art.

SUMMARY

According to various embodiments, disclosed is a sensor pad cover for a sensor pad, the cover comprising a first surface layer and a second surface layer which form an accommodating cavity configured to receive a sensor pad body, the first surface layer further comprising a non-slip layer, wherein both the first surface layer and the second surface layer are formed from at least one biodegradable PBAT/PLA material. The sensor pad can be placed on a seat or a bed, with reduced likelihood of shifting and falling off, and reduces environmental pollution.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Sensor pads are commonly used in the healthcare/medical industry and may be adapted for different uses. For example, sensor pads may be installed on a chair, toilet seat, wheelchair, bed, and the like for detecting and alerting a caretaker if a user/patient may have left the location. Additionally, sensor pads may be used as floor mats in hospitals, nursing homes or individual homes to provide monitoring and alerts regarding a patient who may have fallen. Sensor pads used as floor mats and their associated controls or alarms are also known as bed exit alarm systems and may be used with call systems, as is known in the art. Conventional sensor pads are typically made with PVC material cover which is non-biodegradable and may have a usable life of about 30-45 days, after which the pads are disposed of. This creates waste which harms the environment.

Additionally, the PVC material of conventional sensor pad covers provides a relatively smooth surface. After being placed on the seat or bed, the sensor pad may be easily displaced and detached when the user moves. Furthermore, the PVC material may be affected by temperature and humidity, whereby conditions such as an increase in humidity may cause the pad to become highly slippery and shift out from under the user. Moreover, the PVC material may gradually harden in cooler temperatures, leading to degradation of the product and user dissatisfaction.

To address these problems, the disclosed subject matter provides a sensor pad 10 that reduces the possibility of shifting and displacement when placed on a surface such as a seat or bed. In some embodiments, sensor pad 10 uses biodegradable materials, which may be provided within its outer surface layer(s), to improve user experience and reduce environmental pollution.

Figure 1:
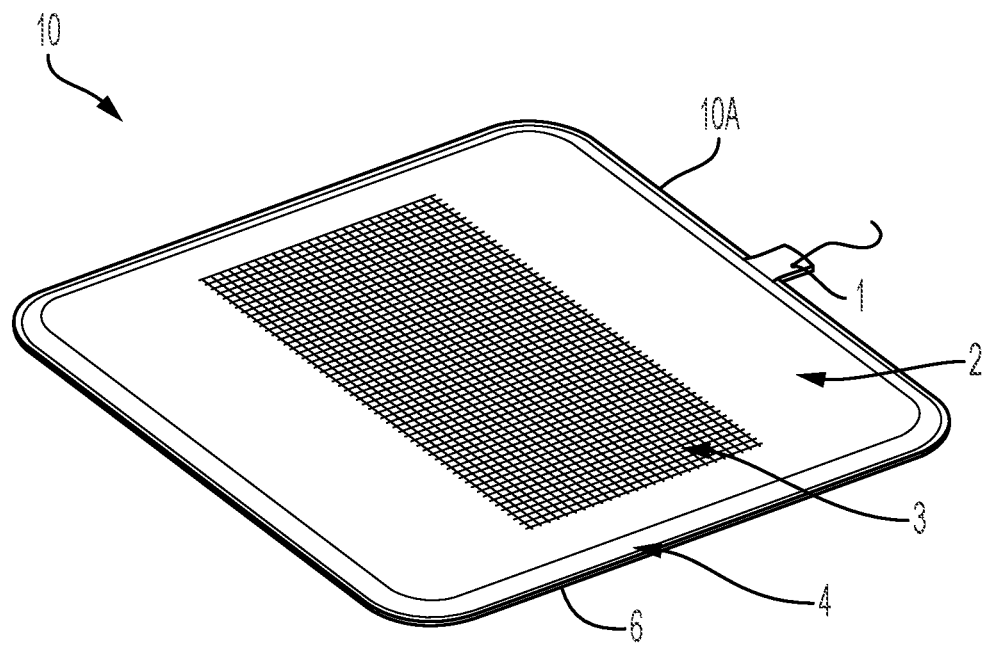
FIG. 1 is perspective bottom view of a sensor pad including an outer cover, according to various embodiments.
Figure 2:
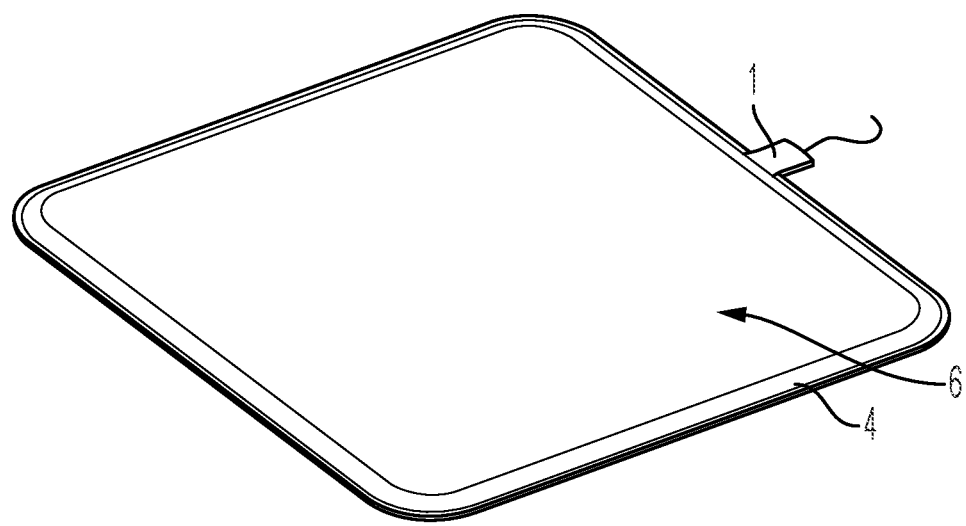
FIG. 2 is perspective top view of the sensor pad of FIG. 1.
Figure 3:
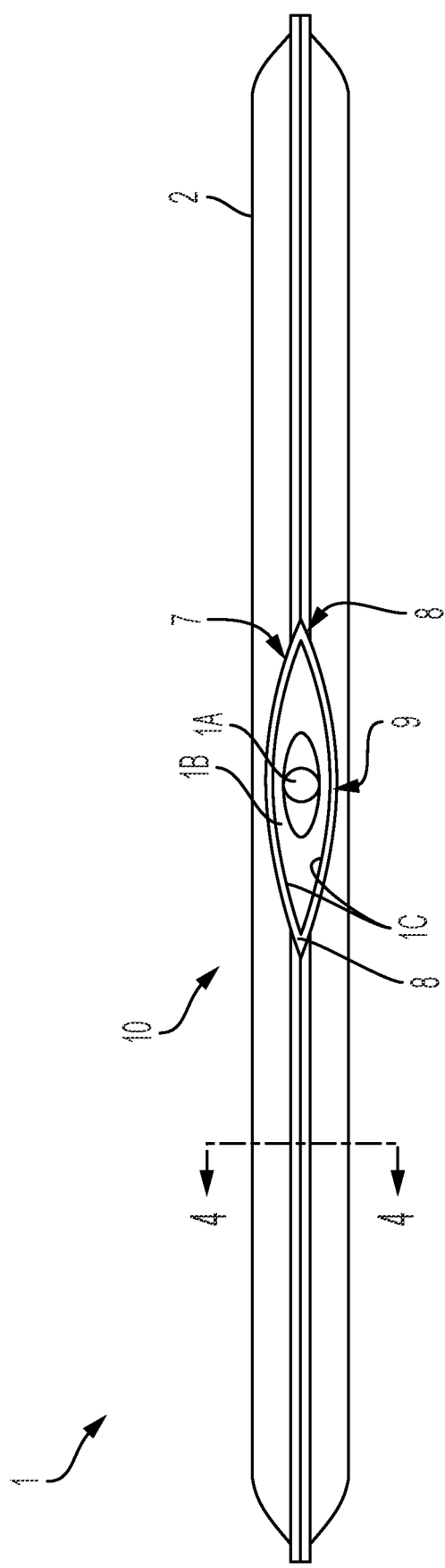
FIG. 3 is a side view of the sensor pad.
Figure 4:
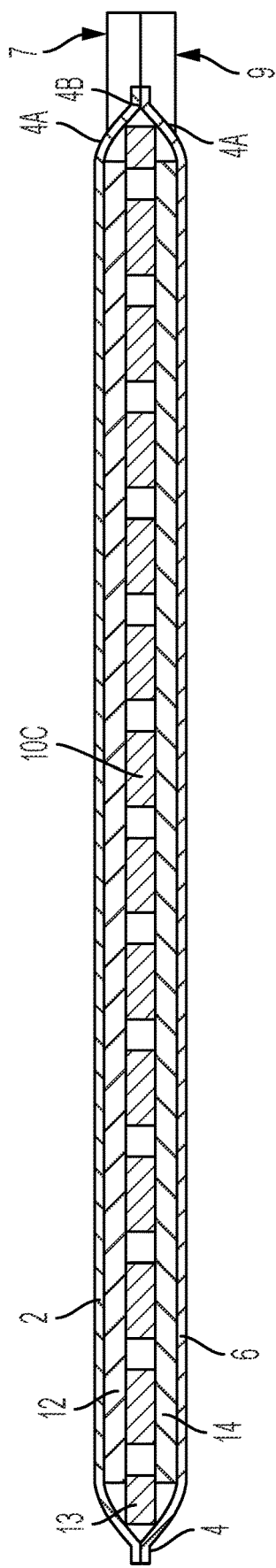
FIG. 4 is s section view taken along line 4-4 of FIG. 3.

In certain embodiments, as depicted in FIGS. 1-4, sensor pad 10 may generally comprise a sensor pad body 10B and an outer cover 10A configured to arrange outside the sensor pad body. In embodiments, outer cover 10A may comprise a first surface layer 2 (also referred to as "bottom layer 2") and a second surface layer 6 (also referred to as "top layer 6"). In certain embodiments, the edges of first surface layer 2 and the edges of second surface layer 6 may be fixedly connected to form an accommodating cavity 10C between the two layers, the accommodating cavity 10C being adapted to receive sensor pad body 10B of sensor pad 10. In some embodiments, an anti-skid layer 3 may be provided atop the first surface layer 2.

In certain embodiments, first surface layer 2 and second surface layer 6 are made of biodegradable material(s). In further embodiments, the materials of the first surface layer 2 and the second surface layer 6 are waterproof, which may prevent sweat and other liquids from entering the accommodating cavity and affecting the sensor pad body. In some embodiments, first surface layer 2 and second surface layer 6 may be made of the same or similar biodegradable material(s). Such materials may further be non-toxic and bacteriostatic. In one embodiment, both the first and second surface layers comprise PBAT/PLA polymers, which may be fully biodegradable. As such, the disclosed sensor pad may be disposed after use (e.g. after about 30-45 days) with minimized environmental pollution. It shall be appreciated that different materials which are biodegradable, which are known or may be available with emerging technology, may be used in alternate embodiments.

In certain embodiments, the edge of the first surface layer 2 and the edge of the second surface layer 6 may be press-molded, to form a transition section 4 between the two layers at the layers' outer borders. In one embodiment, transition section 4 may comprise an arc-shaped section 4A in each of layer 2,6, and an adjoined section 4B of layers 2,6. Transition section 4 may prevent the edges of sensor pad body 10B from being squeezed. It shall be appreciated that layers 2 and 6 may be bonded via various means as known in the art or may be formed from a unitary sheet in alternate embodiments.

Sensor pad 10 can be placed on a seat, bed, or other surface, with anti-skid layer 3 being in contact with the surface. The anti-skid layer 3 may thus prevent the sensor pad 10 from slipping or falling off the surface. Additionally, the PBAT/PLA material forming outer cover 10A of sensor pad 10 is non-toxic as well as biodegradable, enabling outer cover 10A to be completely decompose by environmental microorganisms, and mineralize to become an integral part of the carbon cycle in nature once discarded. This provides a significant benefit over PVC material which harms the environment. Additionally, the PLA/PBAT material is not affected by temperature or humidity fluctuation, providing an overall higher quality and more resilient product in contrast to PVC sensor pads.

In some embodiments, outer cover 10A may be provided with an exhaust port 1 within transition section 4. Exhaust port 1 interrupts transition section 4 to provide a cavity extending outward from accommodating cavity 10C. Exhaust port 1 creates a passage for wiring and/or as an entry opening for the wiring. Exhaust port 1 may further avoid cracking at transition section 4, for example, when a heavy load is applied to sensor 10.

In certain embodiments, inner walls 1C of exhaust port 1 may include a first extension sheet 7 and a second extension sheet 9. The first extension sheet 7 is integrally formed with the first surface layer 2, and the second extension sheet 9 is integrally formed with the second surface layer 6. The ends of first sheet 7 may be fixedly connected to the ends of second sheet 9, and adhesive films 8 are provided on the opposite surfaces of the two extension pieces.

In further embodiments, exhaust port 1 may comprise a first inner section exhaust hole 1A and a second outer section exhaust hole 1B extending from the first exhaust hole, wherein an inner diameter of the first exhaust hole is adapted to the sensor body wire. In certain embodiments, an inner layer of the second exhaust hole may provide a one-way valve which may comprise a viscous film. The one-way valve is configured to only exhaust to the outside to prevent debris from entering the accommodating cavity. After the user in need of nursing leaves, exhaust port 1 may remain closed, and ventilation hole(s) which may be provided within the sensor pad body may suck in air to activate the sensor and restore the shape of sensor pad 10.

In certain embodiments, sensor pad body 10B includes a first sensor pad layer 12, an intermediate layer 13, and a second sensor pad layer 14, wherein at least one side of first sensor pad layer 12 and second sensor pad layer 14 is provided with a conductive plating layer. Additionally, intermediate layer 13 is sandwiched between layers 12 and 14, and may be fixedly connected with the two sensor pad layers. In some embodiments, the intermediate layer 13 is made of insulating material, and several through holes are arranged on it, which are used to make the two sensor pad layers contact the plating layer after being pressed. In one embodiment, first and third layers 12, 14 may comprise a PET circuit board 12, and the intermediate layer 13 may comprise an insulation round hole sponge 13.

A patient may sit or lay on a seat or bed covered with sensor pad 10. The patient's weight causes the sensor pad to squeeze, causing the two sensor plating layers to contact each other through the through hole in the intermediate layer, thereby forming a connection. This initiates a signal that activates an alarm system of the sensor pad. If the patient leaves the seat or bed unexpectedly, the previously squeezed sensor pad gradually returns to its uncompressed state, and the two sensor coatings are separated from each other to form an open circuit to trigger the corresponding external alarm system, thereby alerting caregiver(s).

The above description is only a preferred embodiment of the present invention, but the protection scope of the present invention is not limited to this. Equivalent replacement or modification of the new technical solution and its utility model concept shall be included within the protection scope of the present utility model.

It shall be appreciated that the disclosed sensor pad can have multiple configurations in different embodiments. It shall be appreciated that the components of the sensor pad may comprise any alternative known materials in the field and be of any size and/or dimensions in alternate embodiments. It shall be appreciated that the components of the sensor pad described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A sensor pad cover, comprising:
    a first surface layer and a second surface layer which form an accommodating cavity configured to receive a sensor pad body,
    the first surface layer including a non-slip top layer,
    wherein both the first surface layer and the second surface layer are formed from at least one biodegradable material, wherein the accommodating cavity is provided with an outward-extending exhaust port configured for passage of wiring, wherein the exhaust port comprises a first exhaust hole and a second exhaust hole, and an inner diameter of the first exhaust hole is adapted to the wire, and the second exhaust hole is provided with a viscous film to form a one-way valve.

2. The sensor pad cover of claim 1, wherein an edge of the first surface layer is fixedly connected with an edge of the second surface layer.

3. The sensor pad cover of claim 2, wherein the edge of the first surface layer and the edge of the second surface layer are press-molded to form an arc-shaped transition at an edge position of the outer cover.

4. The sensor pad cover of claim 1, wherein first surface layer and the second surface layer are formed from a same material.

5. The sensor pad cover of claim 1, wherein the first surface layer and the second surface layer are formed from PBAT/PLA material.

6. The sensor pad cover of claim 1, wherein the second exhaust hole comprises a first extension sheet and a second extension sheet, wherein the first extension sheet is integrally formed with the first surface layer, and the second extension sheet is integrally formed with the second surface layer, wherein a first end and a second end of the first extension sheet is fixedly connected to a first end and a second end of the second extension sheet, respectively.

7. The sensor pad cover of claim 1, wherein the cover is configured to removably encase the sensor pad body, such that the cover is replaceable.

8. The sensor pad cover of claim 7, wherein the sensor pad body comprises a first sensor pad layer, an intermediate layer, and a second sensor pad layer, wherein least one side of the first and second sensor pad layers is provided with a conductive coating and the intermediate layer is sandwiched between the first and second sensor pad layers and fixedly connected to the first and second sensor pad layers, and wherein the intermediate layer comprises an insulating material and a plurality of through holes, wherein the through holes are configured to enable contact between the first and second sensor pad layers when the sensor pad body is housed within the sensor pad cover and the first and second sensor pad layers are pressed via force applied to the cover.

9. The sensor pad cover of claim 1, wherein the cover is disposable and biodegradable.

* * * * *